(12) United States Patent
Grziwok et al.

(10) Patent No.: US 9,797,542 B2
(45) Date of Patent: Oct. 24, 2017

(54) LATCH AND BEZEL SYSTEM FOR DEVICE ENCLOSURE

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 14/209,886

(22) Filed: Mar. 13, 2014

(65) Prior Publication Data

US 2014/0263929 A1    Sep. 18, 2014

Related U.S. Application Data

(60) Provisional application No. 61/788,368, filed on Mar. 15, 2013.

(51) Int. Cl.
| | |
|---|---|
| *F16M 11/04* | (2006.01) |
| *F16M 11/22* | (2006.01) |
| *F16M 13/00* | (2006.01) |
| *G06F 1/16* | (2006.01) |
| *E05B 73/00* | (2006.01) |

(52) U.S. Cl.
CPC ........... *F16M 11/04* (2013.01); *F16M 11/041* (2013.01); *F16M 11/22* (2013.01); *F16M 13/00* (2013.01); *G06F 1/1656* (2013.01); *E05B 73/0082* (2013.01)

(58) Field of Classification Search
CPC .......... G01F 1/16; G01F 1/1632; E05B 73/00; E05B 73/0082; A47F 5/0861; A47F 3/002; H05K 5/0208; F16M 11/04; F16M 11/041; F16M 11/22; F16M 13/00; G08B 13/14; G06F 1/16; G06F 1/1632; G06F 1/1656
USPC .............. 248/551, 553; 70/58; 109/50–52; 361/679.57–679.58; 292/3, 8, 10, 32–33, 292/36, 40, 42, DIG. 11, DIG. 63; 206/454, 710–711
See application file for complete search history.

(56) References Cited

U.S. PATENT DOCUMENTS

| | | | |
|---|---|---|---|
| 6,379,073 B1 | 4/2002 | Yoo | |
| 7,218,510 B2 | 5/2007 | Hillman | |
| 7,237,812 B2 * | 7/2007 | Tweedy | E05B 5/00 292/336.3 |
| 7,316,377 B2 | 1/2008 | Smed | |

(Continued)

OTHER PUBLICATIONS http://armodilo.com/products/armotwist, Armodilo ArmoTwist, 2013, downloaded Sep. 25, 2013, 3 pages.

(Continued)

*Primary Examiner* — Ingrid M Weinhold
(74) *Attorney, Agent, or Firm* — Fish & Richardson P.C.

(57) ABSTRACT

One example of a latch and bezel system for a device enclosure can be implemented as a system for mounting electronic equipment. The system includes a support structure. A head unit is configured to receive electronic equipment, and to connect to the support structure. A bezel is positioned in the head unit. The bezel is configured to retain the electronic equipment in the head unit. A release system is configured to be inaccessible when the head unit is connected to the support structure. Upon activation, the release system is configured to release the bezel within the head unit to release the electronic equipment.

14 Claims, 7 Drawing Sheets

(56) References Cited

U.S. PATENT DOCUMENTS

| | | | | |
|---|---|---|---|---|
| 7,404,610 B2* | 7/2008 | Smith | ................... | G11B 33/12 312/223.2 |
| 7,694,922 B2 | 4/2010 | Kim | | |
| 8,109,580 B1* | 2/2012 | Didier | ................... | G09F 19/22 312/245 |
| D687,441 S * | 8/2013 | Janzen | ................... | D14/447 |
| 8,542,495 B1* | 9/2013 | Gorman | ................... | G06F 1/1626 361/679.02 |
| 8,714,665 B2* | 5/2014 | Campagna | ................... | H05K 5/02 312/296 |
| 8,814,128 B2* | 8/2014 | Trinh | ................... | A47F 7/024 248/187.1 |
| 9,032,766 B2* | 5/2015 | Su | ................... | E05B 73/0082 70/14 |
| 9,163,433 B2* | 10/2015 | Sedon | ................... | E05B 73/0082 |
| 9,285,832 B2* | 3/2016 | Galant | ................... | F16M 11/105 |
| 2006/0028103 A1* | 2/2006 | Smith | ................... | G11B 33/12 312/223.2 |
| 2006/0144934 A1* | 7/2006 | Fletcher | ................... | G06F 1/1609 235/383 |
| 2011/0116217 A1* | 5/2011 | Lee | ................... | H05K 5/0217 361/679.01 |
| 2011/0261285 A1* | 10/2011 | Wang | ................... | G02F 1/133308 349/60 |
| 2012/0061542 A1 | 3/2012 | Bostater | | |
| 2012/0099271 A1* | 4/2012 | Hsu | ................... | G06F 1/181 361/679.58 |
| 2012/0318711 A1* | 12/2012 | Stacey | ................... | E05B 73/0082 206/775 |
| 2013/0048802 A1* | 2/2013 | Guran | ................... | F16M 11/041 248/122.1 |
| 2013/0109253 A1* | 5/2013 | Gammon | ................... | F16M 11/10 439/883 |
| 2013/0235521 A1* | 9/2013 | Burch | ................... | G06F 1/1635 361/679.48 |
| 2013/0301216 A1* | 11/2013 | Trinh | ................... | A47F 7/0246 361/679.58 |
| 2013/0342087 A1* | 12/2013 | Guran | ................... | H05K 5/0017 312/7.2 |
| 2014/0118930 A1* | 5/2014 | Sedon | ................... | E05B 73/0082 361/679.56 |
| 2015/0192956 A1* | 7/2015 | Whorton | ................... | B01J 31/02 361/679.43 |

OTHER PUBLICATIONS http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

* cited by examiner

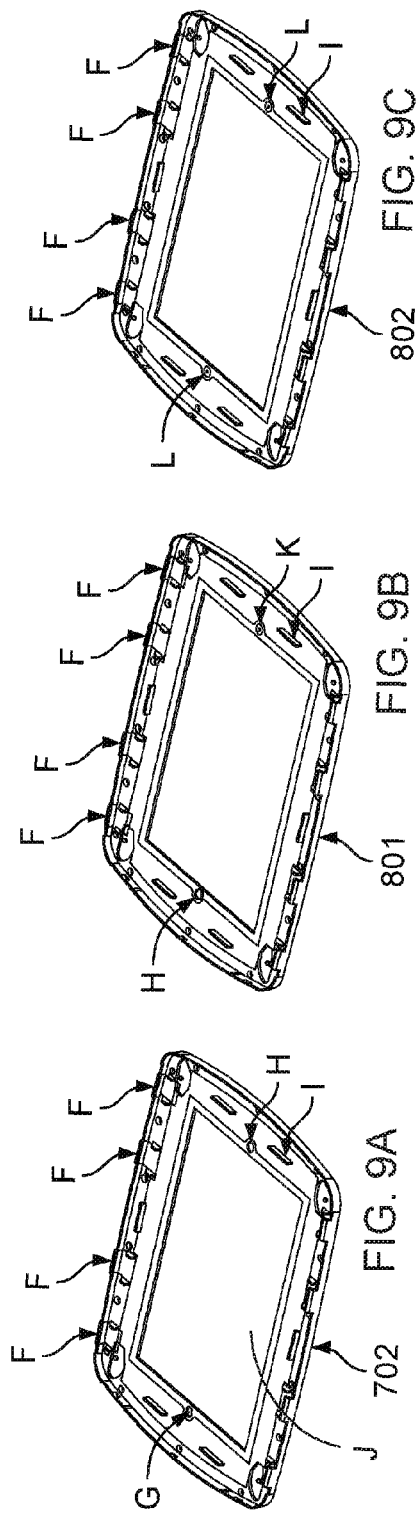
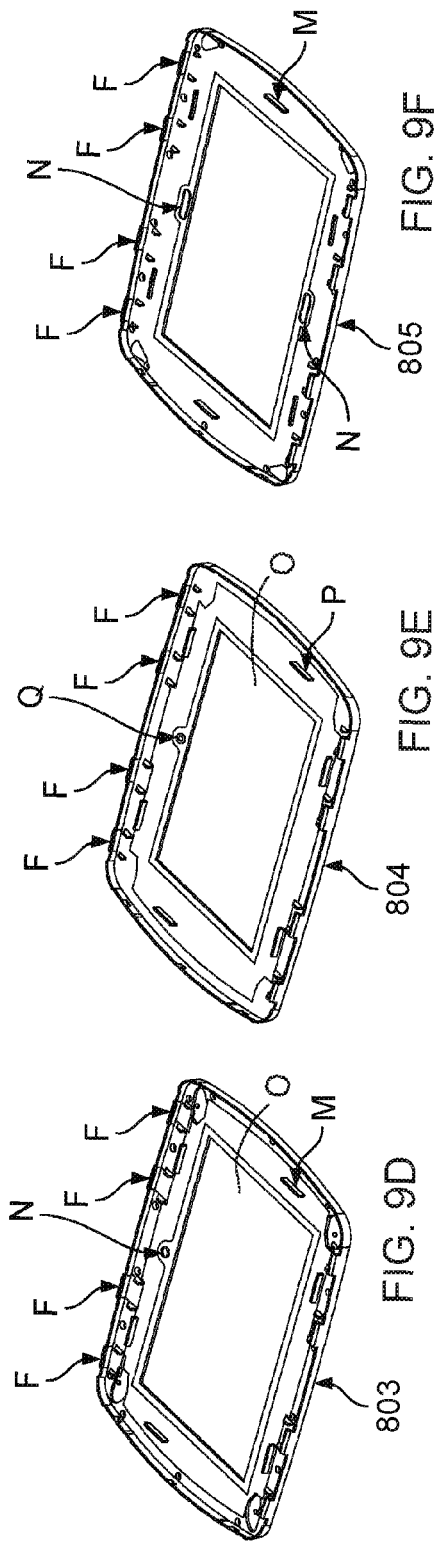

LATCH AND BEZEL SYSTEM FOR DEVICE ENCLOSURE

CROSS REFERENCE TO RELATED APPLICATIONS

This disclosure claims the benefit of the priority of U.S. Provisional Application Ser. No. 61/788,368, filed Mar. 15, 2013, and entitled "Latch and Bezel System for Device Enclosure", which is incorporated herein by reference in its entirety.

TECHNICAL FIELD

This disclosure relates to a latching system for use, for example, with electronic device enclosures. This disclosure also relates to a system of mounting apparatuses which are designed to provide access to the actuating elements of the latching system only by authorized personnel. Such mounting apparatuses, which can be considered part of the support structure for the head unit, can function to provide articulation and/or removabilty of the head unit. This disclosure further relates to a system of interchangeable bezels which are captured (and released) by the latching system and which, due to the common interface provided by the latch hooks, provide for compatibility of the electronic device enclosure with various makes and models of tablet computer, including those which may have different overall dimensions, thicknesses, screen sizes, camera and home button locations. The interchangeability of such bezels can allow a non-technical user to reconfigure the head unit, either to satisfy different user requirements for exposing the camera and/or home button or to accommodate a different model or brand of tablet computer, without the use of tools, once the head unit has been removed from its support structure.

BACKGROUND

A secure device enclosure requires a means to access the enclosed electronic device(s), but only by authorized personnel. Such access can be for the purpose of initial setup of the kiosk, or for maintenance of the electronic device, or to reset the device, or for any other reason that direct access to the electronic device might be required. Such access is preferably provided without damage to the enclosure. It can be further beneficial if such access can be provided without the use of tools. Such access generally requires fully exposing the electronic device, that is, separating and removing the bezel (or faceplate) from other parts of the enclosure housing. A system of access, such as the disclosed latching system, is thus intimately connected with the design of the bezel and overall head unit housing. If access to open the head unit is related to its removal from its support structure (or mounting apparatus) then the interface between the support structure and the head unit is also important in the design of the features for accessing the electronic device within the head unit.

It is desirable that authorized personnel be able to access an enclosed electronic device as easily as possible. It is also desirable that authorized personnel be able to remove a head unit from its support structure, for example for maintenance or for handheld use. It is not desirable that any unauthorized personnel would be able to access an electronic device that is enclosed within a secure enclosure or remove a head unit from its support structure.

One way to provide authorized personnel with access to a secure enclosure is with a key. Another way to provide authorized personnel with access to a secure enclosure is with a special tool, such as could be used to remove security screws. If the key or special tool allows the authorized person to remove the entire head unit from its support structure (and not just the electronic device from within the head unit) then there can be certain benefits, such as the possibility of using the head unit in a handheld fashion or the ability to replace an entire preconfigured head unit with a new one. Once the head unit is removed from the support structure, and assuming it is in the possession of a person authorized to remove it from the support structure, then it is advantageous if access to the electronic device enclosed within the head unit be as easy as possible. In such a scenario, the ability to open the head unit without the use of tools can be desirable.

It is desirable for both manufacturers and users of secure enclosures, particularly secure enclosures for tablet computers, that such secure enclosures be compatible with a broad array of alternate makes and models of tablet computers (for example, or other electronic devices in general). Such compatibility can be provided by offering specialized versions of the bezel (or faceplate) which contains the tablet computer (or other electronic device) from the front. A specialized (configuration-specific) bezel may provide for a specific tablet size, screen size, tablet thickness, location of camera and home button, and other device-specific qualities. If the bezel in such a system can be released from the head unit without the use of tools, it can simplify, and therefore improve, the configurability of the secure enclosure, making it possible for even non-technical users to reconfigure their secure enclosure as they may require (such as for use with a specific make and model of tablet computer, or with only certain features—e.g. camera, home button—of that tablet computer exposed.

SUMMARY

This disclosure relates to a latching system for use, for example, with secure electronic device enclosures. The latching system provides access to the electronic device contained within the enclosure. An enclosure which can contain an electronic device can also be referred to as a "head unit". The latching system can only be accessed once the head unit has been removed from its support structure. The head unit can only be removed from its support structure by use of a key or special tools (such as would be required to remove security screws). Once the head unit has been removed from its support structure, the latching system may be manually operated to release the bezel and open the head unit, thus providing access to the enclosed electronic device. The manual release for the latching system can be centrally located, such as in the center rear of the enclosure. The pinch grips which operate the latching system can be operated with one hand. A support structure may include a mounting apparatus, which may provide various modes of articulation and removability to the head unit. The latching system is compatible with a variety of such mounting apparatuses, all of which block access to the pinch grips when the head unit is mounted to them. The latching system is compatible with a variety of bezels, all of which incorporate bezel retention hooks along their perimeter, and which bezel retention hooks are engaged with by hooks on the latch plate when the bezel is installed. Multiple bezels may be designed that are compatible with the latching system. Such bezels will be interchangeable with each other. Such bezels may be removed from the head unit without tools, once the head unit is removed from its support structure. Such bezels may be designed to accommodate various makes and models of tablet computer, which may have different overall dimensions, thicknesses, screen sizes, camera and home button location, and satisfy different user requirements for exposing the camera and/or home button. As such, the latch system enables reconfiguration of the head unit for compatibility with almost any tablet computer (including future tablet computers not yet known) by changing the bezel, which can be accomplished in the disclosed system without the use of tools.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

FIGS. 9A-9F illustrate a variety of bezels which may be used in conjunction with the latch system.

Like reference numbers and designations in the various drawings indicate like elements.

DETAILED DESCRIPTION

Figure 1:
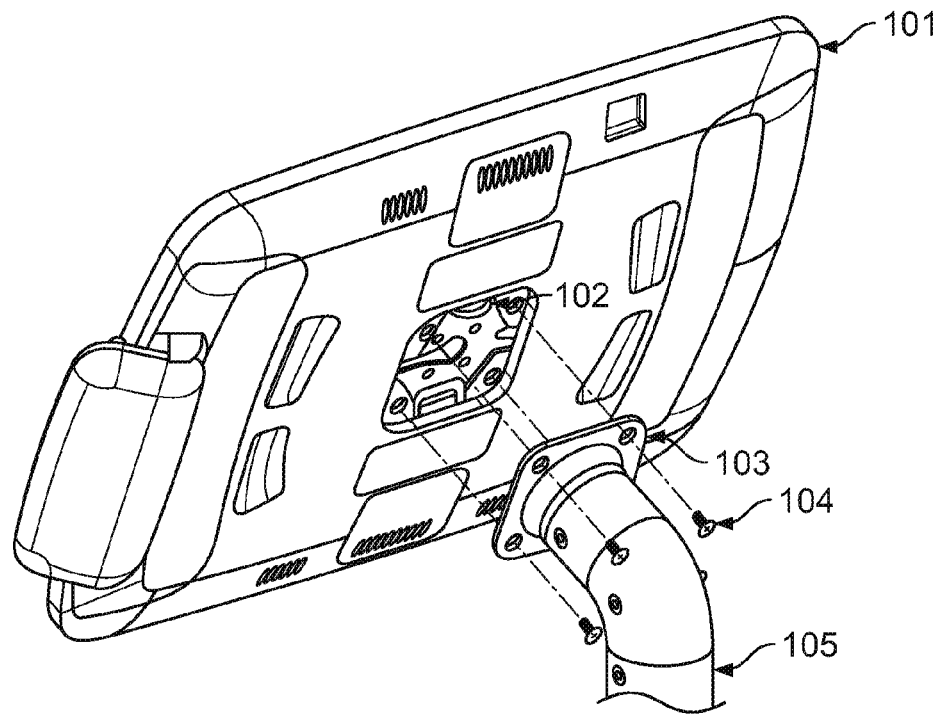
FIG. 1 illustrates an example of a first implementation of a latching system.

This disclosure relates to a design of a latching system for use with secure electronic device enclosures. A secure device enclosure, also referred to as a kiosk (for example, an "electronic kiosk", "computer kiosk", or "tablet kiosk") are used to provide physical security (e.g., theft prevention) for devices, for example, electronic device(s) enclosed within. A secure device enclosure requires a means to access the enclosed electronic device(s), but only by authorized personnel. Such access can be for the purpose of initial setup of the kiosk, or for maintenance of the electronic device, or to reset the device, or for any other reason that direct access to the electronic device might be required. Such access is preferably provided without damage to the enclosure. It can be further beneficial if such access can be provided without the use of tools. Such access generally requires fully exposing the electronic device, that is, separating and removing the bezel (or faceplate) from other parts of the enclosure housing. A system of access, such as the disclosed latching system, is thus intimately connected with the design of the bezel and enclosure housing itself.

One example method to provide security is through the use of security screws, key-locked access or combinations of them. However, the use of security screws to provide physical security may conflict with the need for device access by authorized personnel, for example, because the authorized personnel may not have ready access to the proper tool or tools to easily undo the physical security measures. Similarly, the use of a key lock directly on the device enclosure can provide access, but only to someone in possession of the key.

The latch system described here can allow for and facilitate a variety of levels of access and physical security. The latching system can work in conjunction with a mounting system which can allow the secure device enclosure (referred to, in some implementations, as a head unit) to be detachably mounted to a support structure. The support structure can consist of a tall or short pole, or no pole at all, and can be affixed to any stationary surface, such as a floor, counter, table, or wall. The support structure can also be affixed to a weighted baseplate. The latching system may provide a method of releasing the bezel, thus providing access to the electronic device(s) within, only when it is removed from the support structure to which it is mounted.

The latching system may utilize a pinch release to release the bezel. Such pinch release can be centrally located, so that access to the release is blocked when the head unit is mounted to its support structure. A pinch release can be comprised of two pinch grips, arranged with symmetry on opposite latch plates, each latch plate having one pinch grip. The distance between the pinch grips can be approximately 45 mm, so that the pinch release can be operated comfortably with one hand, using a pinching motion between thumb and finger.

In some implementations, a key can be used to release the head unit from a dock mount, exposing access to the pinch release, which access is otherwise is not available while the head unit is attached to the dock mount. Such a dock mount can be disposed at the distal end of the support structure. In some implementations, security screws can be used to mount the head to the support structure. When the security screws are removed, for example, using the proper tool, access to the pinch release is exposed.

Another method of providing key-locked access to a device enclosure may involve mounting a lock on the head and using it to release the bezel, thus providing access to the enclosed electronic device without removing it from the support structure. However, there can be situations when it is desirable for authorized persons to be able to remove the entire head unit from the support structure, such as when handheld use is desired, or when the device is malfunctioning and it would be expedient to remove the entire head unit and place a new one in its place on the support structure, allowing the malfunctioning device to be repaired without interruption of service.

Once the head unit is removed from the support structure, physical security is defeated because the entire head unit (with the device inside) may be carried away and broken open at a later time. Therefore, a lock on the head unit that locks the bezel over the device inside the head unit provides little additional actual security (relative to a lock on the support structure that releases the entire head) but lacks the benefits (such as handheld use) which accrue when the head unit is kept intact. Additionally, having the lock on the head unit itself can later result in the frustration of a staff person who requires access to the device, has removed it from the support structure, but does not possess the key that opens the head unit to release the device. In some implementations, the latching system described here alleviates this frustration by providing tool-free access to the tablet (or other electronic device contained within the enclosure), by using the pinch release, once the head unit has first been removed from its mount, with the correct key or appropriate tool. At the same time, while the head unit is attached to the mount, the pinch release (which operates the latching system to open the head unit and release the device inside) is inaccessible, thereby providing physical security for the deployed system by preventing any attempts to remove the electronic device from the head unit while it is mounted on the support structure.

In some implementations, an arrangement of lead-ins, guide features, and bevel-driven locking plate combine to allow use of a standard key lock as the actuating element of a mounting apparatus. The docking system described here need not mate with the tablet computer directly. In addition to mechanical support, the docking system can, in some implementations, also provide an electrical interface, thereby providing an interconnect for both power and data. In some implementations, the docking system described here can utilize a key-actuated locking plate which turns within the mount housing. No rotation of the head is required, either for mounting the head or for mating the electrical connector. Additionally, the electrical interface of the dock mount can be independent of the locking element and need not be located on any rotating or translating element.

The latch system can be implemented in conjunction with a mounting system which can allow the enclosure to be removed from its mounting post by using, for example, a key or special tool. The enclosure and mount design can allow access to centrally located pinch grips only when the enclosure is removed from its mounting post. A latch plate disposed within the enclosure can be operated by pinch grips and can engage the bezel with hooks at the bezel perimeter. Springs can act to pull each latch plate outward, thereby retaining the bezel. The springs can be overcome, and the bezel released, by squeezing together the pinch grips on opposing latch plates. A series of attachments at the perimeter of each latch plate can allow them to retain the bezel securely.

The geometry of the latch system facilitates the function of retaining a bezel for a secure electronics enclosure by incorporating a series of hooks at the perimeter of the latch plate that engage with mating hooks on the bezel. It is advantageous for such attachment to occur at the perimeter, as it allows a maximum amount of usable space within the enclosure. It is advantageous for the actuation of the latch to occur at the center rear of the enclosure as that is the location where it is mounted and where the actuating pinch grips can be covered when the head unit is mounted. The latch plates act to bridge the distance between the central mounting and pinch release location and the perimeter bezel attachment location.

The bezel release latch balances important functional requirements in that it provides easy access to the contained electronics for authorized personnel when removed from the mount and being serviced or reconfigured, while maintaining physical security for the device when the housing is mounted and in use. Authorized personnel require access to a tablet within a secure housing from time to time for such things as initial setup, resetting the hardware/software, and repairing or replacing tablets. While the head unit is detached from its mount, the latch system can provide access to the tablet without the use of tools, thus allowing non-technical staff to more easily access and maintain proper operation of the tablet hardware and software.

The series of hooks at the perimeter of the latch plate can further provide a common interface for a series of interchangeable bezels. Such bezels may have various internal and external geometries which makes them suitable for containing various electronic devices which may be mounted within the enclosure. For example, a tablet computer from manufacturer A may have certain outer dimensions (length, width, thickness) while a different model of tablet computer from the same manufacturer, or a tablet computer from a different manufacturer, may have a different set of outer dimensions. Further, different models of tablet computer may, for example, have different screen sizes and different camera locations. Also, in some cases it is preferred to expose the front-facing camera (or home button, or other similar feature) of a tablet in the enclosure, while in other cases it is preferred to cover the front-facing camera (or home button, or sensor, or other similar feature). For these reasons, there may be many bezel options for a user to choose from, and each user may possess more than one bezel, in order to have compatibility with different equipment or for use in different situations. A non-technical user, who may not have skill with tools, may be required to install such bezels, and may also desire to remove and replace or switch bezels. It can be preferred that doing so (removing and replacing the bezel) be possible without the use of tools, particularly since such action is required for access to the electronic device within the enclosure, and occasional maintenance of such device is a necessary activity. The disclosed latching system, in that it is actuated by a pinch grip, enables any bezel to be removed and/or installed without the use of tools, thus simplifying and facilitating needed access to the electronic device within the enclosure. Further, the hook geometry at the perimeter of the latch plates provide a common interface so that all bezels in the system, which are made with hook details that are engaged by the latch plate, can be used interchangeably. Since different bezels are made for different electronic devices, for example tablet computers, the latch system—and associated hook geometry and pinch release—allows the end user to reconfigure the secure enclosure to be compatible with any electronic device—for example tablet computer—and provide access to any functionality—for example front-facing camera and/or home button—as may be desired, without the use of tools. New bezels may also be designed and manufactured when new electronic devices are made available. In this way, the latch and bezel system also enables the enclosure to be compatible with future as-yet-unknown electronic devices.

FIG. 1 illustrates an example of a first implementation of a latching system. The Head Unit 101 is secured by security screws 104 or by other similar method which allows removal by authorized personnel, to the mounting flange 103, which in turn is mounted to a support structure 105. The support structure 105 is a general structure that can be free standing or mounted fixedly to any surface, so as to provide positioning and support to the Head Unit 101 for convenient use. The support structure 105 may optionally provide an internal or external passage for electrical cables, including power or data or both. The Head Unit 101 is secured to the mounting flange 103 by positioning the Head Unit 101 on the mounting flange and installing security screws 104 using the proper tool. The Pinch Grips A, which are part of the latch plates 102, are disposed in the center rear area of the Head Unit 101. When the Head Unit 101 is attached to the mounting flange 103, the Pinch Grips A are covered by the mounting flange 103, thereby blocking access and providing physical security.

Figure 2:
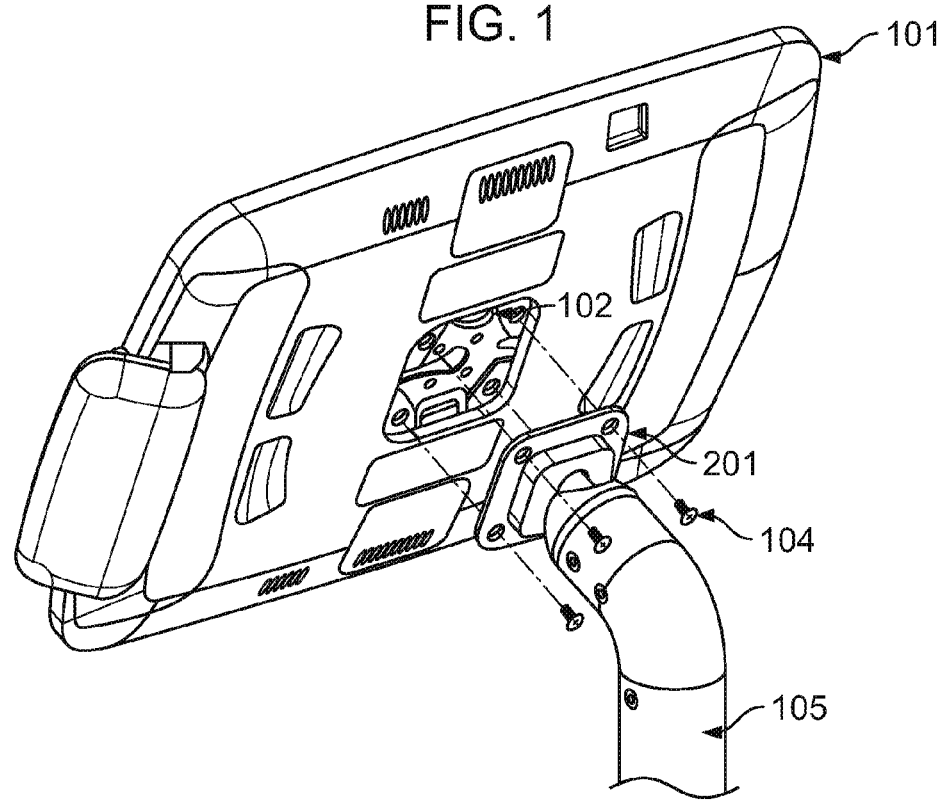
FIG. 2 illustrates an example of a second implementation of a latching system.

FIG. 2 illustrates an example of a second implementation of a latching system. The Head Unit 101 is secured by security screws 104 or by other similar method which allows removal by authorized personnel, to the mounting flange 201. In this implementation, the mounting flange is located at the distal end of an articulating joint 202, which in turn is mounted to the support structure 105. The support structure 105 is a general structure that can be free standing or mounted fixedly to any surface, so as to provide positioning and support to the Head Unit 101 for convenient use. The support structure 105 may optionally provide an internal or external passage for electrical cables, including power or data or both. The Head Unit 101 is secured to the mounting flange 201 by positioning the Head Unit 101 on the mounting flange 201 and installing security screws 104 using the proper tool. The Pinch Grips A, which is part of the latch plates 102, are disposed in the center rear area of the Head Unit 101. When the Head Unit 101 is attached to the mounting flange 201, the Pinch Grips A are covered by the mounting flange 201, thereby blocking access and providing physical security.

Figure 3:
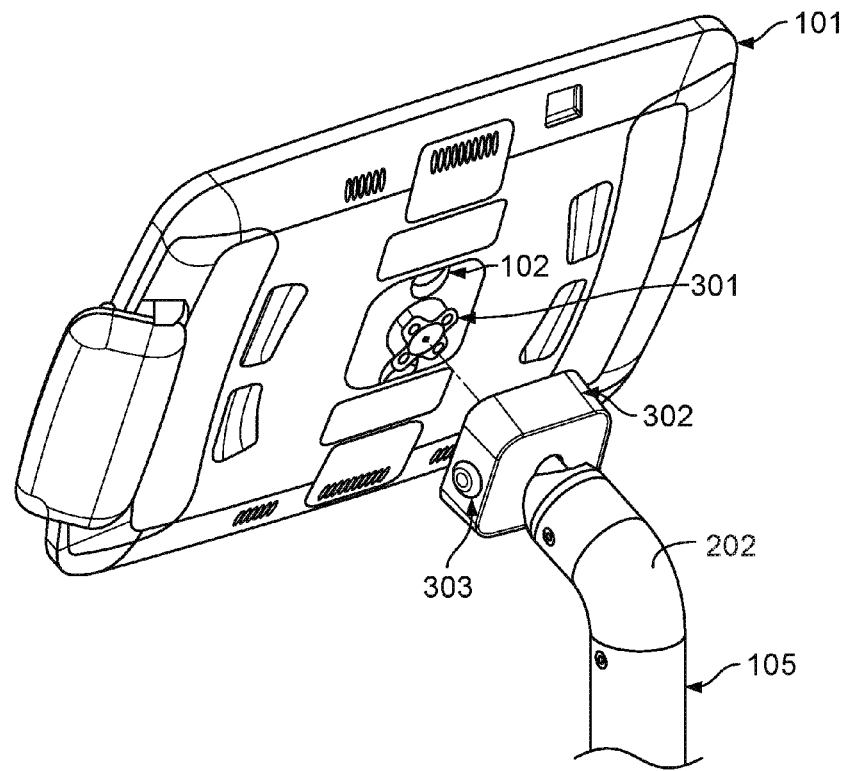
FIG. 3 illustrates an example of a third implementation of a latching system.

FIG. 3 illustrates an example of a third implementation of a latching system. The Head Unit 101 is secured by key lock 303 or by other similar method which allows removal by authorized personnel. The head unit 101 includes, in this implementation, a mounting plate 301 which is engaged/disengaged by a rotating plate within the dock mount 302 when the key lock 303 is operated. The dock mount 302 can be attached to an articulating joint 202, which in turn is mounted to a support structure 105. The dock mount 302 may also be mounted directly to the support structure 105. The support structure 105 is a general structure that can be free standing or mounted fixedly to any surface, so as to provide positioning and support to the Head Unit 101 for convenient use. The support structure 105 may optionally provide an internal or external passage for electrical cables, including power or data or both. The Head Unit 101 is secured to the dock mount 302 by positioning the Head Unit 101 into the dock and moving the key lock 303 to the "locked" position using the proper key. The Pinch Grips A, which are part of the latch plate 102, is disposed in the center rear area of the Head Unit 101. When the Head Unit 101 is mounted to the dock mount 302, the Pinch Grips A are covered by the dock mount 302, thereby blocking access and providing physical security.

Figure 4:
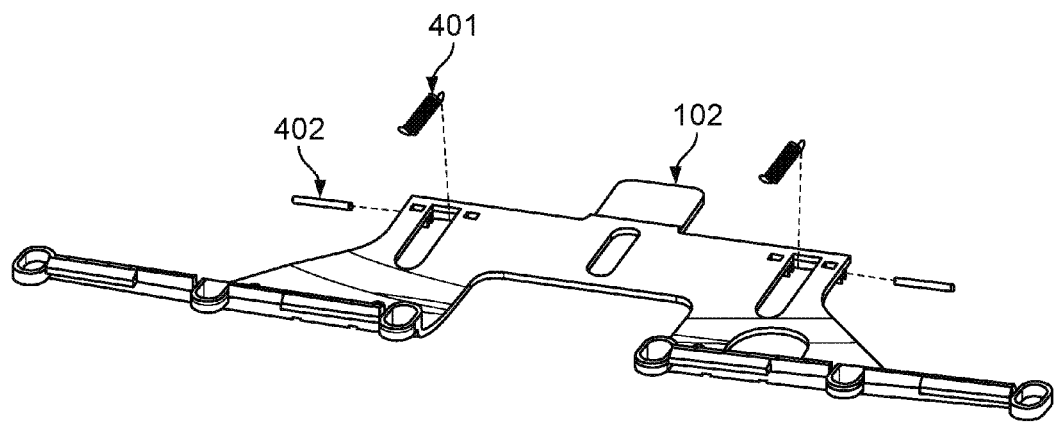
FIG. 4 illustrates an example of preassembly of latch system components.
Figure 8:
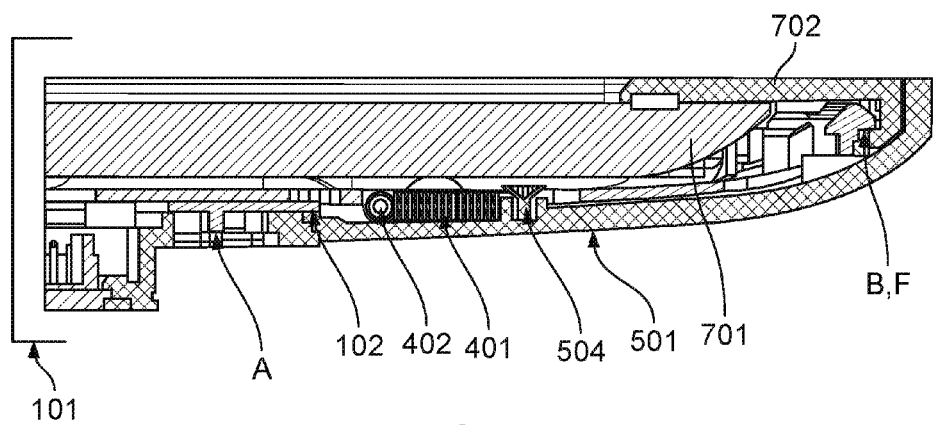
FIG. 8 illustrates a plan view of the assembled latch system.

FIG. 4 illustrates an example of a latch plate, which is part of a latch system. The latch plate 102 is outfitted with two springs 401, attached to the latch plate 102 with pins 402. The latch system may incorporate fewer springs or additional springs, and the springs may be made of any elastic material, such as steel or rubber. The function of the springs 401 is to preload the latch plates 102 into an outward position. When in the outward position the latch holds the bezel to the enclosure, as illustrated in FIG. 8. The springs are overcome by operating the Pinch Release by squeezing together the Pinch Grips A (shown in FIG. 8), thus retracting the latches toward the center of the housing and releasing the bezel.

Figure 5:
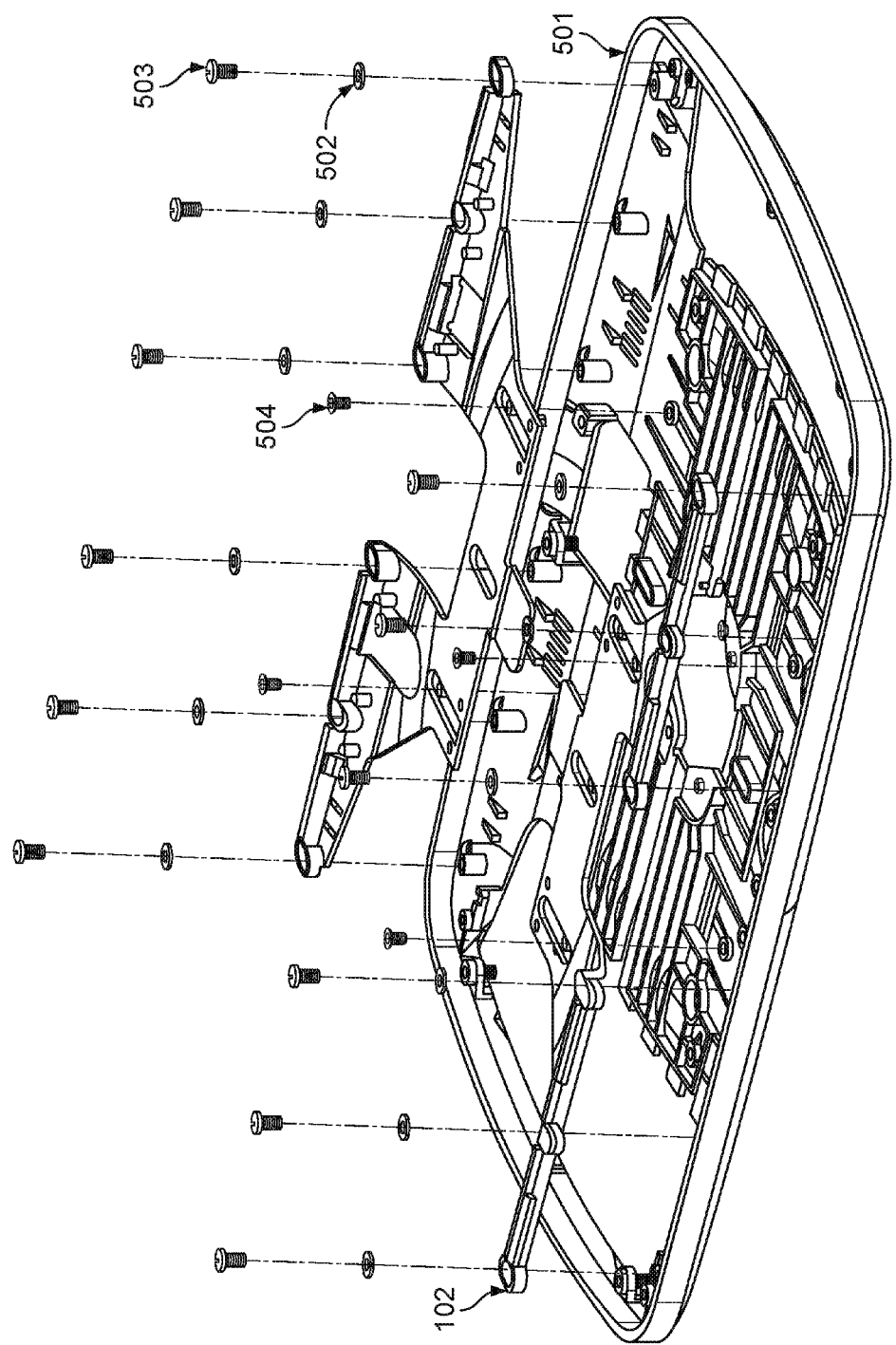
FIG. 5 illustrates an example of the latch system assembled into the housing.

FIG. 5 illustrates an example of the latch system assembled into the housing. The Latch Plates 400 (preassembled per FIG. 4) are placed into the Enclosure Housing 501, and secured with Washers 502 and Screws 503. Alternately, washer-head screws may be used. Alternately, any appropriate mounting and retaining system may be used, including, but not limited to, snap features.

Figure 6:
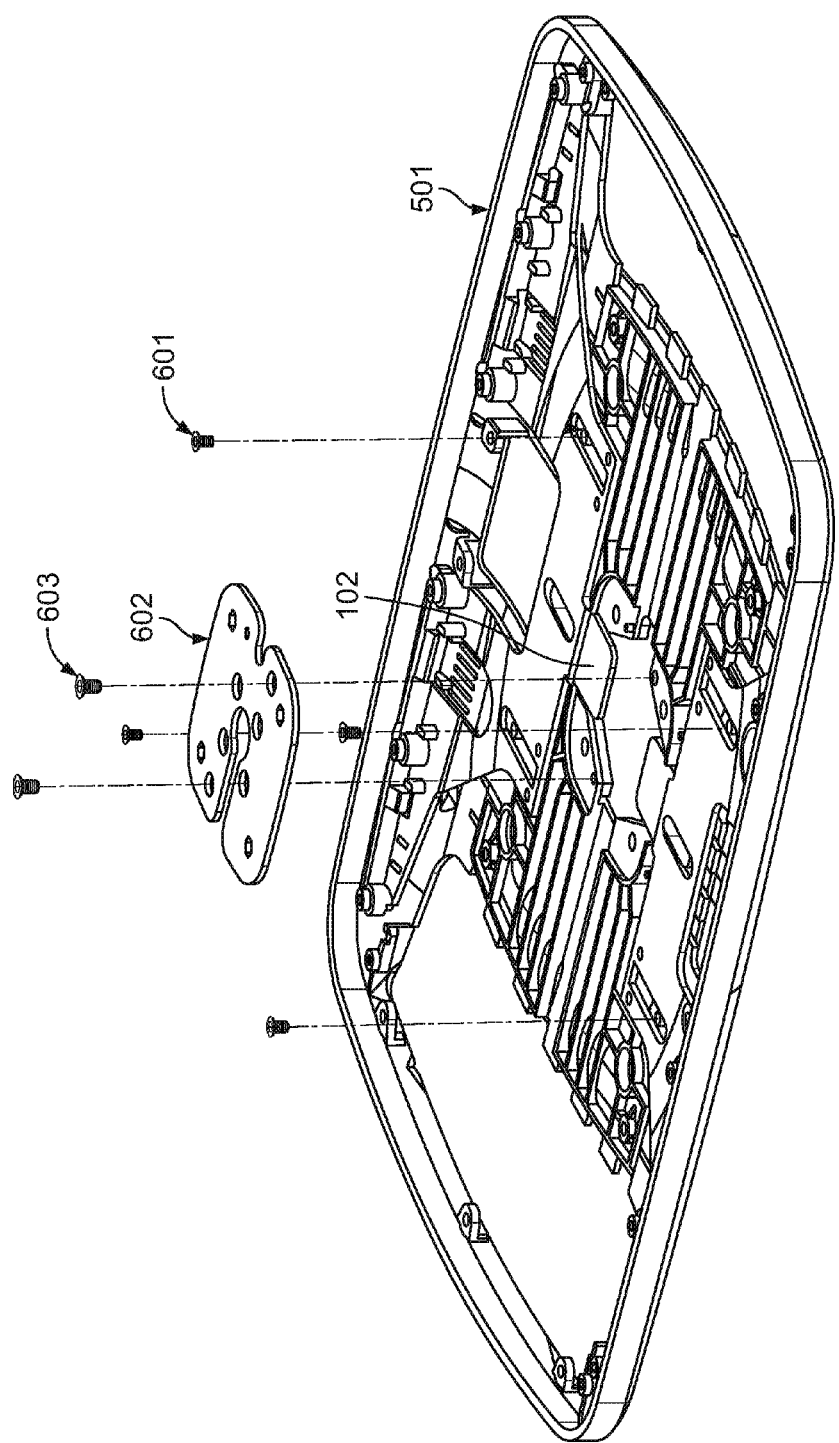
FIG. 6 illustrates an example of the latch system assembled into the housing.

FIG. 6 illustrates an example of the latch system assembled into the housing. Following installation of the latch plates 102 into the housing 501, the Stiffener Plate 602 is assembled over the tabs of the latch plates 102 and secured with Screws 603. The Latch Springs 401 are secured to the Housing 501 with Screws 601, preloading the latch plates 102 in an outward direction. In the example shown, two Latch Springs 401 are secured for each latch plate 102.

Figure 7:
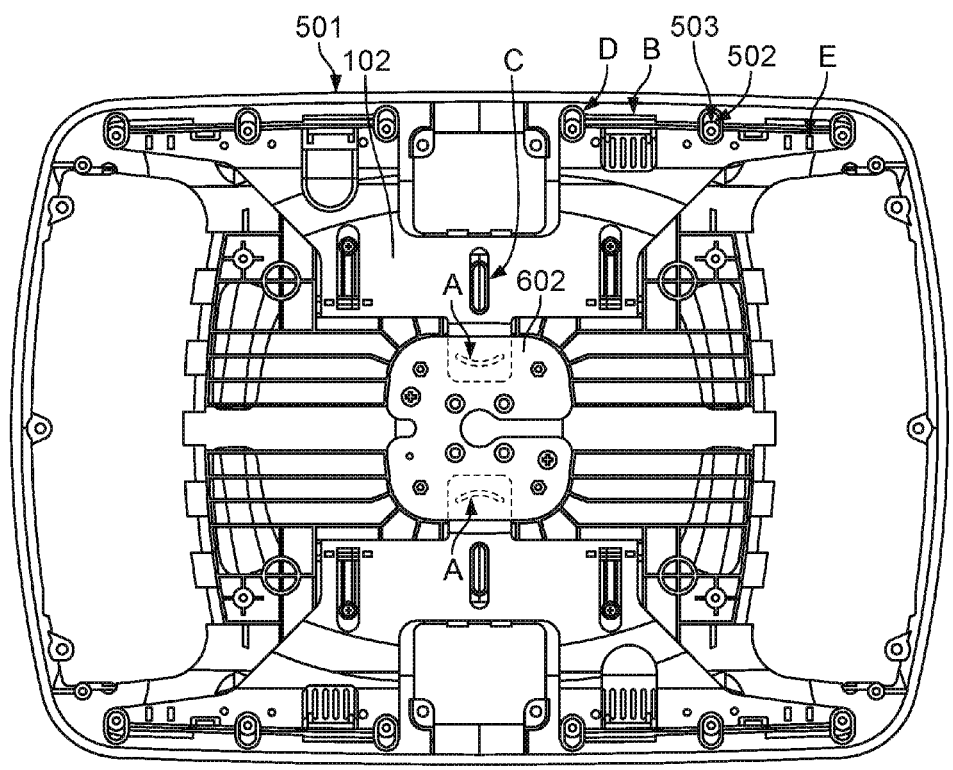
FIG. 7 illustrates a cross-section of the latch system, showing its engagement with a bezel.

FIG. 7 illustrates a plan view of the assembled latch system. The alignment and guiding of the latch mechanism is a key feature of its design. The latch system is operated manually by using the Pinch Release, which entails squeezing together the Pinch Grips A. The Guide Feature C consists of an oblong rib shape, which is disposed directly in line with the Pinch Grips A. The position and shape of the guide feature C act, in combination with the symmetry of the springs 401, to guide the latch plate 102 in a linear, sliding motion without racking or binding. The Stiffener Plate 602, supports the Pinch Grip A area of the latch plate 102 from behind, preventing force at the Pinch Grip A from pushing the latch plate 102 inward. Guide Slots D along the perimeter edge position the hooks B, which function to retain the Bezel. Each Guide Slot D rides along a boss, into which a Screw 503 and Washer 502 are installed. The Screw 503 and Washer 502 act to retain the outward edge of the latch plate 102 within the Housing 501, and in turn retain the Bezel (not shown). Support Ribs E support the latch plate from beneath, and provide rails along which it slides when the Bezel is snapped in place.

FIG. 8 illustrates a cross-section of the latch system. The purpose of the latch system is to retain, and provide a means of releasing, the Bezel 702, thereby allowing access to the Tablet 701 contained within the Head Unit 101. The latch system is operated by pinching inward on the Pinch Grip A, thus pulling the Latch Plate 102 inward. As the Latch Plate 102 pulls inward, the latch hook B releases from the bezel retention hooks F, which are part of the Bezel 702, thus releasing the bezel from the enclosure. To install the Bezel 702, the user simply positions it over the Tablet 701 and presses downward, thus snapping the bezel retention hooks F past the latch hooks B. The latch spring 401, which is disposed between pin 402 that is mounted in latch plate 102 and Screw 504 that secures it to the Housing 501, holds the latch plate 102 outward, maintaining engagement of the latch hooks B with the bezel retention hooks F, which are part of the Bezel 702. Within the assembly, there are two latch plates of this description, arranged with symmetry, thus creating a balanced mechanical operation.

FIGS. 9A-9F illustrate a variety of different bezel designs, all of which are compatible with the latch system. Bezel 702 includes bezel retention hooks F which are engaged by latch hooks B. All bezels in the system contain bezel retention hooks F that are designed to be geometrically identical for all bezels, and which are engaged by latch hooks B. Bezel 702 includes locating ribs I and screen opening J which are designed to locate and reveal the display for a specific model of tablet computer from a first manufacturer. Bezel 702 also provides openings for the "home" button H and for the forward facing camera G, for use in situations where such access is desired. Bezel 801 is designed to contain a tablet that is the same make and model as that for which Bezel 702 is designed. Bezel 801 therefore has the same locating ribs I and screen opening J as Bezel 702. In the case of Bezel 801, free access to only one of the "home" button and the forward facing camera is desired. A hole large enough to access the home button H is provided on one side and a pinhole K is provided on the other side. All bezels are symmetric and may be rotated 180 degrees and still be installed. Taking advantage of this symmetry, Bezel 801 may be rotated so that the access hole is over the home button or the camera, as the user may desire.

As such, Bezel 801 is an example of a bezel that provides access to different features of the same tablet computer as does Bezel 702. Bezel 801 includes the same bezel retention hooks F as does Bezel 702. It may therefore be exchanged with Bezel 702. Such exchange can be performed without the use of tools. The access to different features of the same tablet computer may therefore be configured, using the latch and bezel system, without the use of tools. Bezel 802 is another example of a bezel designed for the same make and model of tablet as bezel 702 and bezel 801. In the case of bezel 802, access to neither the "home" button, nor the front facing camera, is allowed. Those areas are closed and contain only a drill lead L, which may be used to create an opening by hand. Bezel 802 has the same bezel retention hooks F, locating ribs I, and screen opening J as bezel 702 and bezel 801. Bezel 802 is thereby compatible with the same make and model of tablet computer as those bezels, and can be interchanged with those bezels, but in the case of bezel 802, no access to either the "home" button or the front-facing camera is allowed. Bezel 803 is designed for a tablet computer from a second manufacturer. This model of tablet computer has a front-facing camera located slightly off-center, along the long edge of the display. Bezel 803 includes an opening N for that camera, as well as locating ribs M for the tablet (which is a different size than the tablet for which bezels 702, 801, and 802 are designed) and screen opening O (which is also a different size than that the screen opening J on bezels 702, 801, and 802.

Figure 10:
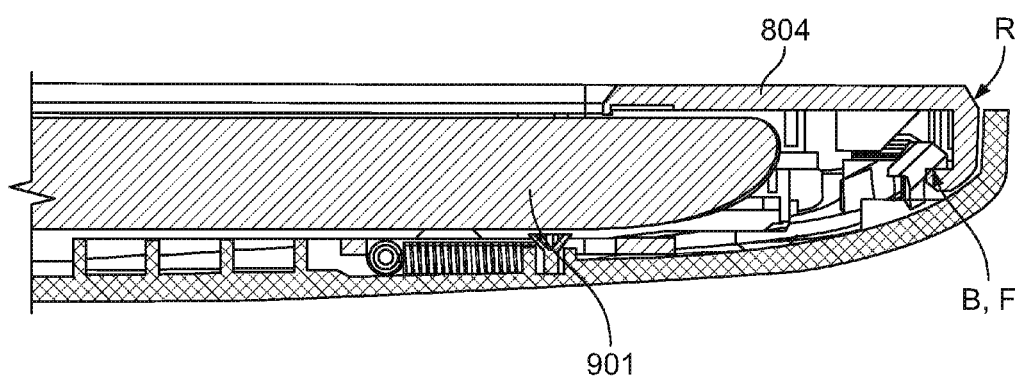
FIG. 10 illustrates an example of a bezel which accommodates a thicker electronic device.

Bezel 803 has the same bezel retention hooks F as all other bezels shown, and therefore interfaces with and can be secured by the same latching system. Bezel 803 is therefore an example of the way in which the latch and bezel system facilitate compatibility of the overall secure enclosure system with multiple models and manufacturers of tablets, even those with substantially different overall dimension and screen size. Bezel 804 is designed for a tablet computer from a third manufacturer. This model of tablet computer has a front-facing camera located on-center, along the long edge of the display. Bezel 804 includes an opening Q for that camera, as well as locating ribs P for that tablet (which is a different size than the tablet for which bezels 702, 801, 802, and 803 are designed) and screen opening 0 (which is also a different size than that the screen opening J on bezels 702, 801, 802, and 803. In addition, Bezel 804 is designed to accommodate the greater thickness of the tablet computer for which it was designed by incorporating an offset in the location of the front face (and inside surface) of the bezel. This is illustrated in FIG. 10. Bezel 804 has the same bezel retention hooks F as all other bezels shown, and therefore interfaces with and can be secured by the same latching system.

Bezel 804 is therefore an example of the way in which the latch and bezel system facilitate compatibility of the overall secure enclosure system with multiple models and manufacturers of tablets, even those with substantially different thickness. Bezel 805 is designed for a tablet computer from a fourth manufacturer. This model of tablet computer has a front-facing camera located on center, along the long edge of the display, and a home button, located on center along the opposite long edge. Bezel 805 includes an opening N for that camera, a symmetric and identical opening N for the home button, as well as locating ribs M for the tablet (which is a different size than the tablet for which bezels 702, 801, 802, 803, and 804 are designed) and screen opening O (which is also a different size than that the screen opening J on bezels 702, 801, 802, 803, or 804). Bezel 805 has the same bezel retention hooks F as all other bezels shown, and therefore interfaces with and can be secured by the same latching system. Bezel 805 is therefore an example of the way in which the latch and bezel system facilitate compatibility of the overall secure enclosure system with multiple models and manufacturers of tablets, even those with substantially different overall dimension, screen size, and camera/home button locations.

FIG. 10 illustrates a cross-section showing the engagement of latch hooks B with bezel retention hooks F, which are part of bezel 804. Bezel 804 incorporates offset R, which raises the front and inside faces of the bezel, allowing it to accommodate the greater thickness of tablet computer 901. Bezel 804 is therefore an example of the way in which the latch and bezel system facilitate compatibility of the overall secure enclosure system with multiple models and manufacturers of tablets, even those with substantially different thickness.

Certain aspects of the subject matter described here can be implemented as an electronics mounting system comprising a support structure and a removable head portion which is designed such that securing the head portion to the support structure blocks access to a centrally located manual release which, when actuated, acts to release the bezel without the use of tools, thus providing access to the device contained within the head portion, but only if the head portion has first been removed from the support structure, using the appropriate tool or key.

Certain aspects of the subject matter described here can be implemented as an electronics mounting system which uses a key to secure the head portion to the support structure, and which support structure, when the head portion is mounted to it, blocks access to a manually operated release, centrally located on the rear of the head portion which, when actuated, acts to release the bezel, thus providing access to the device contained within the head portion without the use of tools.

Certain aspects of the subject matter described here can be implemented as an electronics mounting system which uses screws, including security screws, to secure the head portion to the support structure, and which support structure, when the head portion is mounted to it, blocks access to a manually operated release, centrally located on the rear of the head portion which, when actuated, act to release the bezel, thus providing access to the device contained within the head portion without the use of tools.

Certain aspects of the subject matter described here can include a spring-loaded latch plate which has a geometric design and a sliding action to allow a latch plate which is manually operated at one end to secure and release the edge of a bezel at the other end.

Certain aspects of the subject matter described here can be implemented to mount opposing latch plates, each of which include pinch grip features such that the pinch grips are located in a proximate and central position of a head unit, so that the pinch grips may be squeezed together with one hand, and which act to release a bezel from the front of a head unit.

Certain aspects of the subject matter described here can be implemented to mount opposing latch plates, each of which include pinch grip features such that the pinch grips are located in a proximate and central position of a head unit, such that the pinch grips are covered when the head unit is mounted to its support structure.

Certain aspects of the subject matter described here can be implemented to include a particular arrangement of guide features, which are disposed within a secure electronics housing, and which guide a bezel release latch in a smooth sliding motion.

Certain aspects of the subject matter described here can be implemented to use hooks around the perimeter of a bezel, and particularly the bezel for a secure electronics housing, which allow said bezel to be retained by a latch.

Certain aspects of the subject matter described here can be implemented as a bezel latching system as part of a secure tablet kiosk system.

A number of implementations of the disclosure have been described. Nevertheless, it will be understood that various modifications can be made without departing from the spirit and scope of the disclosure.

The invention claimed is:

1. A system for mounting electronic equipment, the system comprising:
   a support structure;
   a head unit configured to receive electronic equipment, and to connect to the support structure;
   a bezel positioned in the head unit, the bezel configured to retain the electronic equipment in the head unit, wherein the bezel comprises a substantially rectangular hollow portion having a perimeter configured to be positioned around a front portion of the electronic equipment in the head unit; and
   a latching system comprising a first pinch grip and a second pinch grip, the latching system configured to be inaccessible when the head unit is connected to the support structure and to be accessible when the head unit is detached from the support structure, the first pinch grip and the second pinch grip configured, upon activation, to release the bezel within the head unit to allow access to the electronic equipment, wherein the latching system comprises:
      a first latch plate disposed in the head unit, the first latch plate comprising the first pinch grip and a first plurality of hooks which retain the bezel to the head unit; and
      a second latch plate disposed in the head unit, the second latch plate comprising the second pinch grip and a second plurality of hooks which retain the bezel to the head unit,
      wherein the first latch plate and the second latch plate are arranged opposite each other and are configured such that when the first pinch grip and the second pinch grip are squeezed towards each other, the first plurality of hooks and the second plurality of hooks release the bezel.

2. The system of claim 1, further comprising:
   a key lock configured to secure the head unit to the support structure, the key lock operable by a key to either secure or release the head unit from the support structure.

3. The system of claim 2, further comprising a dock mount attached between the support structure and the head unit.

4. The system of claim 3, further comprising an articulating joint mounted to the support structure, wherein the dock mount is attached to the articulating joint.

5. The system of claim 3, further comprising a mounting plate configured to be captured or released within the dock mount when the key lock is operated.

6. The system of claim 1, wherein the latching system is centrally positioned on an inside rear surface of the head unit.

7. The system of claim 1, wherein the first pinch grip and the second pinch grip are positioned near a center of the head unit to be covered when the head unit is mounted to the support structure.

8. The system of claim 1, the latching system further comprising:
   a plurality of springs attached to the first latch plate and the second latch plate to preload the first latch plate and the second latch plate into an outward position away from a center of the head unit; and
   a plurality of pins to attach the plurality of springs to the first latch plate and the second latch plate, wherein one or more pins of the plurality of pins attach each spring of the plurality of springs to the first latch plate and the second latch plate.

9. The system of claim 8, wherein the first pinch grip and the second pinch grip, upon activation, overcome the plurality of springs, retracting the first latch plate and the second latch plate toward the center of the head unit to release the bezel from the first plurality of hooks and the second plurality of hooks.

10. The system of claim 8, wherein the first plurality of hooks and the second plurality of hooks are configured to mate with and around a perimeter of the bezel.

11. The system of claim 1, wherein the electronic equipment includes a tablet computer.

12. A system for mounting electronic equipment, the system comprising:
   a support structure;
   a head unit configured to receive electronic equipment, and to connect to the support structure;
   a bezel positioned in the head unit, the bezel configured to retain the electronic equipment in the head unit, wherein the bezel comprises a substantially rectangular hollow portion having a perimeter configured to be positioned around a front portion of the electronic equipment in the head unit; and
   a latching system comprising a plurality of pinch grips, the latching system configured to be inaccessible when the head unit is connected to the support structure and configured to be accessible when the head unit is detached from the support structure, the plurality of pinch grips configured, upon activation, to release the bezel within the head unit to allow access to the electronic equipment, the latching system further comprising:
      a plurality of latch plates, configured to hold the bezel in the head unit;
      a plurality of springs attached to each latch plate to preload the latch plate into an outward position away from a center of the head unit; and
         a plurality of pins to attach the plurality of springs to the latch plate, wherein one or more pins of the plurality of pins attach each spring of the plurality of springs to the latch plate.

13. The system of claim 12, wherein the plurality of latch plates comprises:
   a first latch plate disposed in the head unit, the first latch comprising first hooks retaining the bezel to the head unit;
   a second latch plate disposed in the head unit, the second latch comprising second hooks retaining the bezel to the head unit; and
   wherein the plurality of pinch grips comprises:
      a first pinch grip connected to the first latch plate, wherein the first pinch grip is configured to be activated by moving the first pinch grip toward the center of the head unit to cause the first latch plate to release the bezel; and a second pinch grip connected to the second latch plate, wherein the second pinch grip is configured to be activated by moving the second pinch grip towards the center of the head unit to cause the second latch plate to release the bezel.

14. The system of claim 13, wherein the first pinch grip and the second pinch grip, upon activation, overcome the plurality of springs, retracting the first latch plate and the second latch plate toward the center of the head unit causing the first hooks and the second hooks to release the bezel.

* * * * *